United States Patent [19]

Boutrois

[11] Patent Number: 4,494,691

[45] Date of Patent: Jan. 22, 1985

[54] LINE-BY-LINE DOCUMENT SCANNER EQUIPPED WITH A DEVICE FOR CONTROLLING THE POSITION OF DOCUMENTS

[75] Inventor: Guy Boutrois, Paris, France

[73] Assignee: Thomson-CSF, Paris, France

[21] Appl. No.: 442,507

[22] Filed: Nov. 17, 1982

[30] Foreign Application Priority Data

Nov. 17, 1981 [FR] France ................................ 81 21483

[51] Int. Cl.³ ............................................. G06K 7/10
[52] U.S. Cl. .................................. 235/470; 235/454; 235/476; 250/557; 250/569; 382/10
[58] Field of Search ...................... 235/454, 470, 476; 250/557, 569; 382/10

[56] References Cited

U.S. PATENT DOCUMENTS

| 2,512,547 | 6/1950 | Kleis et al. | |
| 2,807,414 | 9/1957 | Howard | |
| 3,163,746 | 12/1964 | Hoeser | 235/454 |
| 4,147,295 | 4/1979 | Nojiri et al. | 235/470 X |
| 4,179,621 | 12/1979 | Crean et al. | 235/454 X |

FOREIGN PATENT DOCUMENTS

| 31728 | 7/1981 | European Pat. Off. |
| 41319 | 12/1981 | European Pat. Off. |
| 2120171 | 8/1972 | France |

OTHER PUBLICATIONS

IBM Tech. Disc. Bul., vol. 24, No. 1B, Jun. 1981, Kida, "Short-Paper Detection in Paper Path", pp. 547-548.
IBM Tech. Disc. Bul., vol. 23, No. 7A, Dec. 1980, Perkins, "Paper Edge Sensor", pp. 2695-2696.

Primary Examiner—David L. Trafton
Attorney, Agent, or Firm—Oblon, Fisher, Spivak, McClelland & Maier

[57] ABSTRACT

A scanner is provided with photosensors and a stationary registration mark placed on each side of the reading window. The registration mark is thus located in the reading field of the photosensors as long as no document is presented for scanning within the reading window. A document which arrives within the reading window is interposed between the registration mark and the photosensors. A comparison circuit coupled with the photosensors delivers a document-reading start signal when the reading signal no longer corresponds to a registration-mark reading signal stored in memory during a preceding reading operation, that is, when the front edge of the document begins to enter the reading window.

3 Claims, 4 Drawing Figures

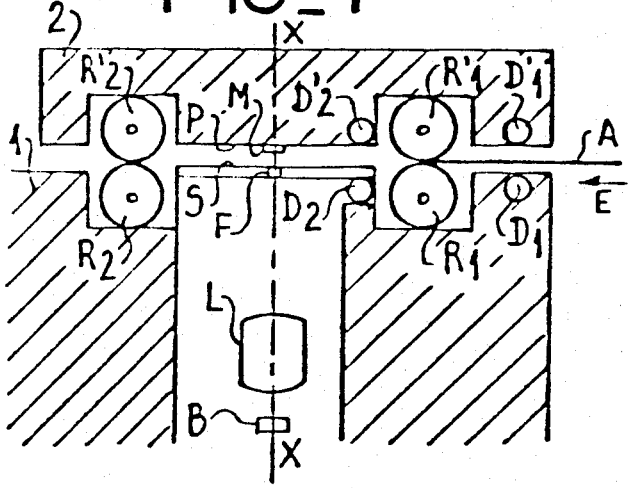
FIG_1
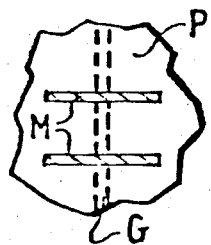
FIG_2
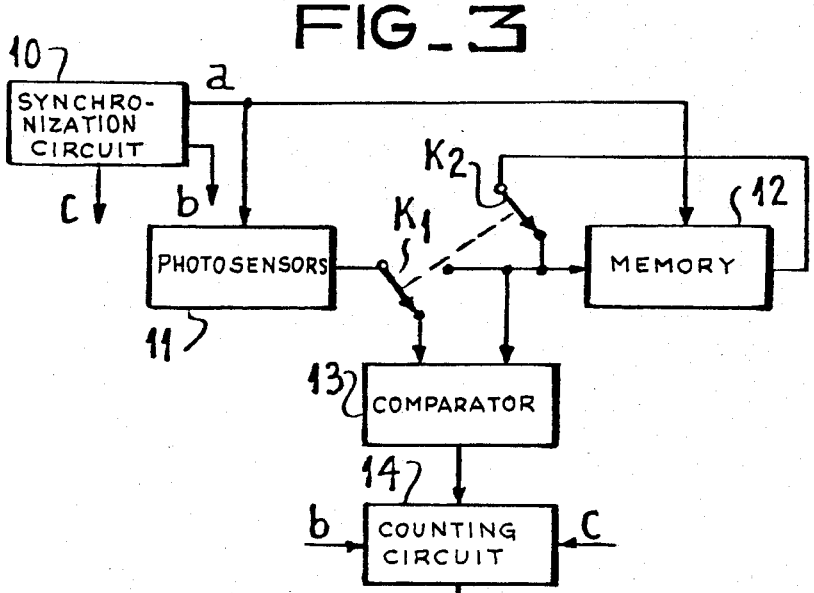
FIG_3
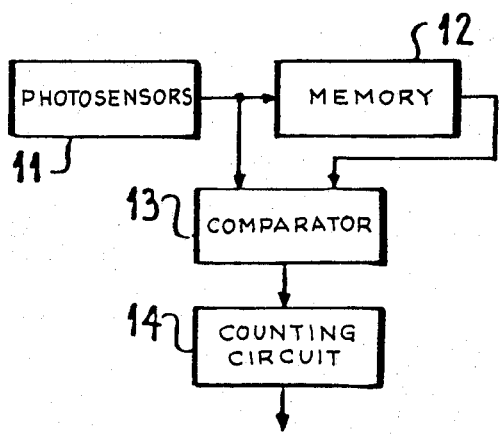
FIG_4

LINE-BY-LINE DOCUMENT SCANNER EQUIPPED WITH A DEVICE FOR CONTROLLING THE POSITION OF DOCUMENTS

This invention relates to a scanner for line-by-line scanning of a document by means of n photosensors (where n is a whole number greater than 1). The scanner is equipped with a device which has a function of controlling the passage of the document to be scanned and comprises: m out of the n photosensors (n+1>m>0), a registration mark located within the reading field of the m photosensors on the side opposite to the photosensors with respect to the surface of transfer of the document in front of the photosensors, and a comparison circuit coupled with the m photosensors.

Scanners of this type already exist, as disclosed in particular in U.S. Pat. No. 2,512,547 in which the registration mark is a movable mark drawn on a document conveyor belt. This belt forms a loop stretched between two parallel cylinders which rotate about their axes and drive the belt. The registration mark consists of a set of lines disposed lengthwise along the belt and of lines disposed obliquely. A registration mark of this type is difficult to produce in practice since the longitudinal and oblique lines must be drawn with a high degree of accuracy in order to prevent any risk of introduction of errors. Furthermore, dust particles deposited on the registration mark are also liable to introduce errors.

In another known system disclosed in U.S. Pat. No. 2,807,414 and employed when the document is scanned by transparency, the document is detected by means of photosensors as it passes within the scanning slit. Detection takes place as a result of variation in luminosity at the instant of appearance of the front edge of the document within the slit. A device of this type is attended by two major drawbacks. In the first place it cannot be applied to scanners in which the light source employed for illuminating the document is placed on the same side of the document as the photosensors. In the second place, the device presents problems in regard to scanning of documents consisting of highly transparent paper since the control device may not detect the passage of a document in such a case or else it may detect a document transfer when no document is present.

The object of the present invention is to overcome or at least to reduce the disadvantages mentioned in the foregoing.

This aim is achieved in particular by means of a registration mark and by employing within the comparison circuit a memory and a circuit for counting differences between the signals of the memory and the scanning signals.

According to the invention, there is provided a scanner for line-by-line scanning of a document, comprising:
- a surface for transfer of the document in continuous motion,
- means for causing the document to slide along the surface,
- n photosensors (where n is a whole number greater than 1) each having a reading field and adapted to deliver scanning signals;
- a registration mark drawn on a fixed support and located within the reading field of m out of the n photosensors (where m is a whole number with $0<m<n+1$), the registration mark and the n photosensors being respectively located on the two sides of said surface,
- a comparison circuit for detecting the passage of the document between the registration mark and the m photosensors, comprising: a memory having an input coupled for receiving the signals of the m photosensors at least at the beginning of a reading process and one output; a comparator having a first input coupled for receiving the signals of the m photosensors at least starting from an instant located between the beginning of a reading process and the beginning of transfer of the document between the registration mark and the m photosensors, a second input coupled to the output of the memory at least starting from said instant and one output; and a counting circuit connected to the output of the comparator for counting at the time of each line scan the number of times different signals are received on the first and on the second input of the comparator.

Other features of the invention will be more apparent upon consideration of the following description and accompanying drawings, wherein:

FIG. 1 is a partial schematic view of a scanner according to the invention, at the level of the system for displacing and reading the document;

FIG. 2 is a detail view of an element of FIG. 1;

FIGS. 3 and 4 are electronic diagrams relating to devices for checking the correct positioning of the document prior to reading in a scanner according to the invention.

The partial view of FIG. 1 shows a scanner for line-by-line optical scanning of a document A. Said scanner is made up of two portions: a lower portion 1 forming a support and an upper portion or paper clamp 2. A mechanical positioning and locking device (not shown) serves to place the upper portion 2 in a highly accurate position with respect to the lower portion 1.

The lower portion 1 has a surface S on which the document A travels in the direction indicated by an arrow E while scanning is in progress. The scanning operation is performed by means of a photosensor strip B which is rigidly fixed to the lower portion and by means of a magnifying lens system L placed between the strip B and a reading window F within which the document is scanned.

The photosensor strip consists of an array of photosensors arranged in a line at right angles to the plane of FIG. 1. In the example described, an array composed of 1728 photosensors has a length of 21 mm along which the magnifying lens system L serves to read document lines 216 mm in length. The optic axis of reading by the photosensors is designated schematically in FIG. 1 by a straight line X—X.

The paper is displaced in continuous motion by means of two pairs of rollers $R_1 R'_1$ and $R_2 R'_2$. Each pair comprises a driving roller $R_1 R_2$ coupled with a motor (not shown) and a free roller $R'_1 R'_2$. While scanning is in progress, the document is clamped between the rollers of each pair.

Detection units $D_1 d'_1$, $D_2 D'_2$ (whose design function will be described hereinafter) each comprise a light source $D'_1 D'_2$ rigidly fixed to the upper portion 2 and an optoelectronic detector $D_1 D_2$ rigidly fixed to the lower portion and located opposite to the light source with which it is associated. In FIG. 1, the light sources and the detectors are represented schematically by circles.

The detection unit $D_1 D'_1$ is intended to warn the scanner in advance that a reading process is being initiated or in other words that a document A is being presented for scanning (but has not yet reached the scanning position within the reading field of the photosensors of the strip B) in order to permit start-up of the motors for driving the rollers $R_1$ and $R_2$. The unit $D_1 D'_1$ can be replaced by a push-button depressed by the operator at the moment of commencement of scanning of a document.

The detection unit $D_2 D'_2$ is intended to warn the scanner that a document A is nearing completion of the scanning process in order to permit stopping of the motors which drive the rollers $R_2$ and $R'_2$.

The detection units $D_1 D'_1$ and $D_2 D'_2$ do not need to detect a document at a well-defined point of its displacement within the scanner. As a consequence, there is no objection to the use of optoelectronic detectors which, according to the extent of aging, will call for a greater or lesser portion of the light beam delivered by the light source associated with said detectors. It is a different matter, however, in the case of the detection unit which is intended to deliver a signal for correct positioning of the document in order to begin scanning of this latter or in other words for stopping the front edge of the document at the precise instant of entry into the reading window.

The scanner according to FIG. 1 is also equipped with a detection unit provided with a registration mark M represented schematically by a small rectangle located beneath the surface P of the paper clamp 2 opposite to the document transfer surface S. Said mark M, an enlarged portion of which is shown in FIG. 2, is formed by black lines painted on the white surface P of the paper clamp. These lines are arranged at right angles to the portion G of the surface P of the paper clamp 2 which is within the field of the photosensors. The limits of the portion G are indicated by dashed lines in FIG. 2. The detection unit which includes the registration mark M is also provided with photosensors which have the registration mark within their reading field. The mark is therefore read by the photosensors until the front edge of the document to be scanned arrives within the window F and stops the reading operation.

FIG. 3 shows one example of construction of an electronic circuit which utilizes the reading signals produced by the photosensors associated with the registration mark of FIG. 1 in order to deliver a signal which indicates that the front edge of the document is within the reading window. Said electronic circuit comprises a unit 11 which is constituted by the photosensors and their reading registers and which will be designated for the sake of enhanced simplicity as "the photosensors 11" throughout the following description. The output signals of the photosensors 11 are applied to the nodal point of a switch $K_1$ which is coupled mechanically with a switch $K_2$. The input of a memory 12 is coupled to the first terminal of the switch $K_1$ and to the second terminal of the switch $K_2$. The output of said memory is connected to the nodal point of the switch $K_2$. The inputs of a comparator 13 are connected to the second terminal of the switch $K_1$ and to the input of the memory 12 whilst the output of said comparator is connected to the input of a counting circuit 14. Said counting circuit 14 is constituted by a counter followed by a circuit for decoding a given count value of the counter and delivers the signal which indicates that the front edge of the document is within the reading window. A synchronization circuit 10 constituted by a clock circuit, the output signals of which are controlled by the microcomputer of the scanner, delivers the synchronization signals a required for reading the contents of the photosensors 11 and of the memory 12. Said memory is constituted by a 1728-position shift register having a capacity equal to one reading line. The above-mentioned signals a are conventional photosensor control signals which are already found in scanners of known types. In the case of the example described, said signals are pulse trains having a frequency of 250 kHz. Signals b which are identical with the signals a but are delayed in order to take into account the transit times within the comparator 13 are also delivered by the circuit 10 and are applied to the counting circuit 14. The presence of said signals is intended to permit advance of the counter 14 as a function of the signals received from the comparator 13. The counting circuit 14 is reset after each line reading by means of a signal c which is delivered by the synchronization circuit 10 and which is also provided in known scanners for initiating the line reading operation.

The operation of the circuits of FIG. 3 is as follows. Prior to each reading operation, the switches $K_1 K_2$ (which are represented schematically by mechanical switches but are in fact electronic switches) are in the position in which the photosensors 11 are connected to the input of the memory 12 whilst the output of said memory 12 is connected to the non-connected second terminal of the switch $K_2$. The signal for initiating operation of the switches $K_1 K_2$ is delivered by one output (not shown) of the synchronization circuit 10. This signal is constituted by start-of-reading-line pulses. Thus a first pulse delivered after the detection unit $D_1 D'_1$ (shown in FIG. 1) has been turned-on permits storage within the memory 12 of the line read by the photosensors or in other words of the registration-mark reading line since the document has not yet arrived between the registration mark and the photosensors. The following start-of-reading-line pulse initiates changeover of the switches to the position shown in FIG. 3. The counting circuit 14 does not deliver any signal as long as the reading signals produced by the photosensors 11 are substantially identical with the signals stored in the memory 12. To this end, in order to take into account for example, dust particles which may be deposited on the registration mark during operation, the decoding circuit of the counting circuit 14 does not decode the value 1 but the value 8 in order to ensure that recognition of the disappearance of the registration mark corresponds to a number (equal at a minimum to eight) of non-coincidences between the 1728 data delivered at each reading by the photosensors and the 1728 data stored in the memory 12.

Another example of construction of an electronic circuit which utilizes the document-reading photosensors in order to deliver a signal for indicating that the front edge of the document is within the scanning window is given in FIG. 4. In this figure, the synchronization circuit and the synchronization signals are not shown in order to simplify the description and also because they are derived from the same technology as those relating to FIG. 3. The electronic circuit illustrated in FIG. 4 differs from the circuit shown in FIG. 3 in the suppression of the switches $K_1 K_2$, in the direct coupling between the output of the photosensors and the input of the memory 12 and the first input of the comparator 13 and in the direct coupling between the output of the memory 12 and the second input of the comparator 13. In the electronic circuit according to FIG. 4, the reading line of the registration mark is not stored in the memory 12 prior to commencement of reading of the document as in the case of FIG. 3. In fact, in the case of FIG. 4, the signals produced by reading of one line are recorded in the memory 12 instead of the signals produced by reading of the preceding line in order to be compared with the signals produced by reading of the following line. To this end, the memory 12 is constituted by a shift register. Detection of the edges of a document relies on the difference between the last line of reading of the registration mark and the first line of reading of the document at the moment of arrival of this latter in front of the reading window F.

The present invention is not limited to the examples described in the foregoing. Thus the registration mark can permit the design of a scanner in which the length of the reading line is automatically adapted to the width of the document to be scanned. In fact, when the document which arrives in front of the reading window is of smaller width than the complete line read by the photosensors, at least one of the two ends of that portion of the registramark which is placed within the reading window F is not concealed by the passage of the document. It is therefore possible as a function of the results of the comparison performed by the comparator 13 to determine the width of the document and to transmit at the output of the scanner the reading data which are limited to the document.

Similarly, the width of the registration mark can be smaller than the length of the total line read by the photosensors, with the result that only a part of the photosensors serves to read the registration mark in this case.

It is also possible to dispense with the detection units $D_1 D'_1, D_2 D'_2$ of FIG. 1. In that case, the presence of the document need no longer be detected by the scanner but, as already mentioned at the beginning of this specification, can be announced by the operator who depresses a push-button just before introducing the document into the scanner. In regard to the end of the document to be scanned, detection can be performed, for example, by means of the electronic circuits shown in FIGS. 3 and 4: this involves a continuous search for the registration mark during reading of the document; when the counting circuit 14 no longer delivers an output signal, it is considered that the registration mark has been found again and that scanning of the document has been completed. This method of determining the end of a document is subject to a disadvantage: a configuration which is similar to the registration mark may be present on a document to be scanned and give rise to an erroneous end-of-document signal.

It should also be noted that the mark-reading line which is stored in memory in order to serve as a reference in the comparison (comparator 13 of FIGS. 3 and 4) may be stored in a read-only memory and not introduced, by reading of the registration mark, in a shift register at the beginning of each document-loading operation as was the case with the circuits shown in FIGS. 3 and 4. Storage in a read-only memory, however, is subject to a disadvantage in that it is not possible to take into account either degradations of the registration mark in the course of time (dust particles, wear and so on) or errors in positioning of the paper clamp (upper portion 1 of FIG. 1) when said paper clamp is removable and intended to be handled, or aging of the reading photosensors.

The present invention is applicable to all fields of line-by-line scanning by means of photosensors such as remote-copying and photocopying devices.

What is claimed is:

1. A scanner for line-by-line scanning of a document, comprising:

a surface for transfer of the document in continuous motion, means for causing the document to slide along the surface, n photosensors (where n is a whole number greater than 1) each having a reading field and adapted to deliver scanning signals, a registration mark drawn on a fixed support and located within the reading field of m out of the n photosensors (where m is a whole number with $0<m<n+1$), said registration mark and said n photosensors being respectively located on the two sides of said surface, comparison circuit for detecting the passage of the document between the registration mark and the m photosensors, comprising: a memory having an input coupled for receiving the signals of the m photosensors at least at the beginning of a reading process and one output; a comparator having a first input coupled for receiving the signals of the m photosensors at least starting from an instant located between the beginning of a reading process and the beginning of transfer of the document between the registration mark and the m photosensors, a second input coupled to the output of the memory at least slarting from said instant and one output; and a counting circuit connected to the output of said comparator for counting at the time of each line scan the number of times different signals are received on the first and on the second input of said comparator.

2. A scanner according to claim 1, wherein the comparison circuit further comprises a switching device for coupling the m photosensors to the input of the memory at the beginning of a reading process and then to the first input of the comparator from the instant aforesaid.

3. A scanner according to claim 1, wherein the memory and the comparator are continuously connected to the m photosensors and wherein the memory is constituted by a shift register in order to deliver to the second input of the comparator the scanning signals of the m photosensors of the scanned line preceding the line whose scanning signals are delivered at the same instant by the m photosensors to the first input of said comparator.

* * * * *